(12) United States Patent
Cherian

(10) Patent No.: US 7,490,270 B2
(45) Date of Patent: Feb. 10, 2009

(54) METHOD, SYSTEM, AND SOFTWARE FOR REBUILDING A STORAGE DRIVE

(75) Inventor: Jacob Cherian, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 561 days.

(21) Appl. No.: 10/984,110

(22) Filed: Nov. 9, 2004

(65) Prior Publication Data
US 2006/0112302 A1    May 25, 2006

(51) Int. Cl.
*G06F 11/00* (2006.01)
(52) U.S. Cl. .............. 714/42; 714/6; 714/7; 714/8; 711/161; 711/162
(58) Field of Classification Search .......... 714/42
See application file for complete search history.

(56) References Cited

U.S. PATENT DOCUMENTS

| | | | |
|---|---|---|---|
| 5,390,327 A | 2/1995 | Lubbers et al. ........... 395/575 |
| 5,742,752 A | 4/1998 | DeKoning .............. 395/182.04 |
| 5,790,773 A | 8/1998 | DeKoning et al. ...... 395/182.04 |
| 6,775,794 B1 | 8/2004 | Horst et al. ................... 714/42 |
| 7,024,527 B1* | 4/2006 | Ohr ............................. 711/161 |
| 2005/0086443 A1* | 4/2005 | Mizuno et al. .............. 711/162 |
| 2005/0262400 A1* | 11/2005 | Nadeau et al. ............... 714/42 |
| 2006/0143501 A1* | 6/2006 | Tormasov et al. .............. 714/5 |

* cited by examiner

*Primary Examiner*—Emerson C Puente
(74) *Attorney, Agent, or Firm*—Baker Botts L.L.P.

(57) ABSTRACT

When a storage drive used as part of a redundant storage system is rebuilt, a drive controller obtains information for the rebuild process from an operating system (OS) specific agent. The information may include a bitmap, which indicates portions of a logical unit being used by the operating system. The bitmap is provided to a controller specific agent, which manipulates the bitmap into a form indicating which physical portions of the storage drive correspond to the portions of the logical unit being used by the operating system. The storage controller uses the bitmap to rebuild those portions of the physical storage drive being used by the operating system prior to rebuilding other portions of the physical storage device.

19 Claims, 3 Drawing Sheets

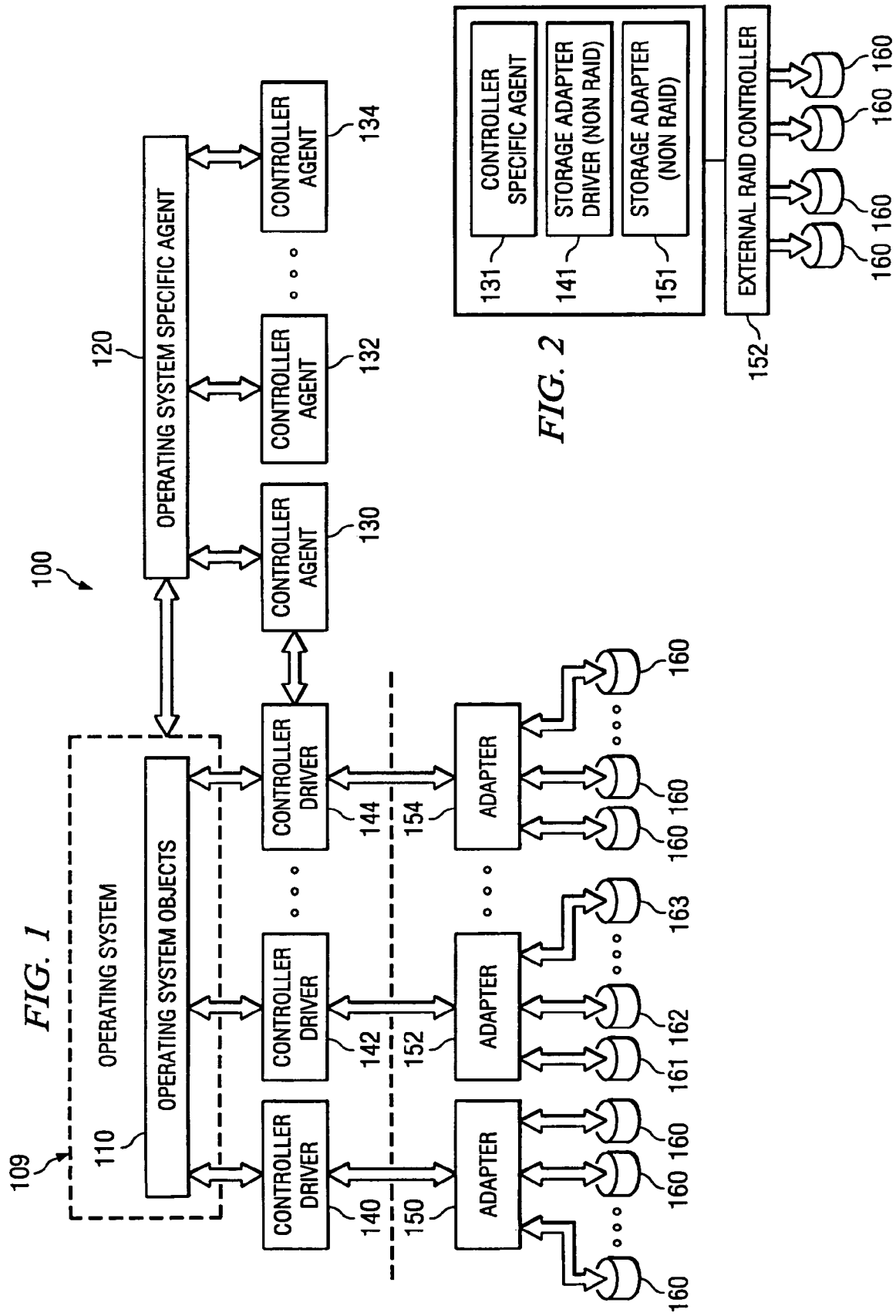

METHOD, SYSTEM, AND SOFTWARE FOR REBUILDING A STORAGE DRIVE

TECHNICAL FIELD

The present disclosure relates generally to rebuilding a storage drive used as part of a redundant storage system, and more particularly to rebuilding portions of the storage drive used by operating system software.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

To provide the data storage demanded by many modern organizations, information technology managers and network administrators often turn to one or more forms of RAID (redundant arrays of inexpensive/independent disks). Typically, the disk drive arrays of a RAID are governed by a RAID controller and associate software. In one aspect, a RAID may provide enhanced input/output (I/O) performance and reliability through the distribution and/or repetition of data across a logical grouping of disk drives.

RAID may be implemented at various levels, with each level employing different redundancy/data-storage schemes. RAID 1 implements disk mirroring, in which a first disk holds stored data, and a second disk holds an exact copy of the data stored on the first disk. If either disk fails no data is lost, because the data on the remaining disk is still available.

In RAID 3, data is striped across multiple disks. In a four disk RAID 3 system, for example, three drives are used to store data and one drive is used to store parity bits that can be used to reconstruct any one of the three data drives. In such systems, a first chunk of data is stored on the first data drive, a second chunk of data is stored on the second data drive, and a third chunk of data is stored on the third data drive. An Exclusive OR (XOR) operation is performed on data stored on the three data drives, and the results of the XOR are stored on the parity drive. If any of the data drives, or the parity drive itself, fails the information stored on the remaining drives can be used to recover the data on the failed drive.

Regardless of the RAID level employed, the RAID controller presents all of the disks under its control to the information handling system as a single logical unit. In some implementations, a RAID disk controller may use one or more hot-spare disk drives to replace a failed disk drive. In such an instance, the data of the failed drive may be reconstructed on the hot-spare disk drive using data from the other drives that are part of the logical unit. The process of reconstructing the data of a failed or replaced drive onto a substitute drive is often referred to as rebuilding the drive. By rebuilding the failed drive, the logical unit may be returned to its redundant state, with the hot-spare disk drive becoming part of the logical unit. In addition, if revertible hot-spare disk drives are supported, when the failed drive is replaced with an operational drive the contents of the hot-spare disk drive may be copied to a new drive, and the hot-spare disk drive returned to "standby" status.

Along with the increase in data storage requirements of enterprises comes a corresponding increase in the size of disk drives and logical units created from disk drives. As a result, the process of rebuilding a RAID logical unit to a hot-spare disk drive and then returning the hot-spare disk drive to its hot-spare status can take significant amounts of time—especially when there is concurrent I/O to the logical units from one or more host systems. The long time required to rebuild a RAID logical unit generally means that the system is operating in a degraded mode, during which the system is exposed to data loss if a second drive in the logical unit fails, or if a media error occurs on one of the peer drives in the logical unit. In addition, the operations required to perform the rebuild of a replacement drive require resources from the RAID controller and can cause a reduction in overall performance.

SUMMARY

In accordance with teachings of the present disclosure, a system, method, and software are described for rebuilding selected portions of a storage drive, e.g. a disk drive, used in a redundant storage system, e.g. RAID. By providing a redundant-storage controller with information about which portions of a physical drive are used by an operating system, the rebuild of a physical drive can be targeted. That is, portions of the drive being used by the operating system can be rebuilt before portions of the storage drive not being used by the operating system. In some embodiments, only the portion of the drive used by the operating system is rebuilt.

By rebuilding first, or only, those portions of the storage drive that are in use, the time a system operates in a degraded mode (e.g. without redundancy) can be reduced. It is interesting to note that conventional systems, e.g. systems which rebuild a storage drive without taking into account which portions of the drive are being used by the operating system, run in a degraded mode for about the same amount of time whether the drive being rebuilt is substantially full or almost empty.

An embodiment of a method disclosed herein includes providing a redundant-storage controller with information indicating which portions of a storage drive correspond to portions of a logical unit used by an operating system, and rebuilding the indicated portions of the storage drive.

An information handling system according to an embodiment of the present disclosure includes a processor, memory operably connected to the processor, and a controller to control redundant-storage of information to a multiple storage drives. The system also includes software that provides the controller with information indicating which portions of a storage drive correspond to portions of a logical unit used by an operating system to store data for itself or for applications that run on the operating system. This information can then be used by the controller to initiate a rebuild of the portions of the storage drive used by the operating system.

In yet another embodiment, a computer readable medium is provided. The computer readable medium includes at least one executable instruction to request an operating system agent to provide information about which portion of a logical unit is being used by an operating system. The computer readable medium also includes instructions to receive the information from the operating system agent in response to the request and determine which portion of a storage drive corresponds to the identified portion of the logical unit. Additionally, the computer readable medium includes at least one executable instruction to provide a storage controller with an indication of which portions of the storage drive are determined to be in use.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 is a block diagram illustrating interactions between an operating system (OS) specific agent, controller agents, operating system storage objects and redundant storage controllers, according to an embodiment of the present disclosure.

FIG. 2 is a block diagram illustrating an external RAID controller with associated drivers and agents according to an embodiment of the present disclosure.

DETAILED DESCRIPTION

Figure 3:
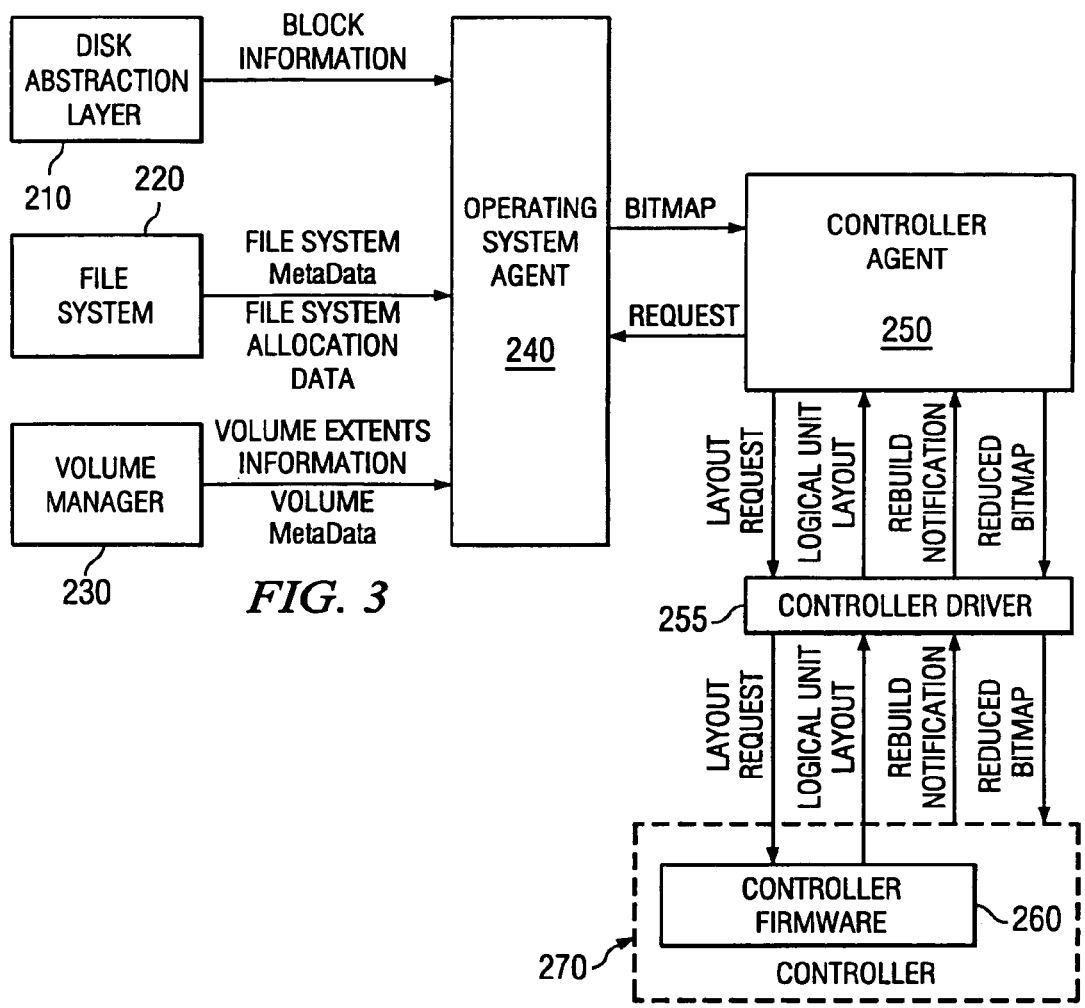
FIG. 3 is a block diagram illustrating an operating system agent and a controller agent cooperating to provide a redundant storage controller with data identifying portions of a physical drive to be rebuilt according to an embodiment of the present disclosure.

Preferred embodiments and their advantages are best understood by reference to FIGS. 1 through 5, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring to FIG. 1, a system according to an embodiment of the present disclosure will be discussed. The diagram of FIG. 1 illustrates the interaction between system hardware, elements of which are shown below the heavy dashed line, and software, elements of which are illustrated above the heavy dashed line. Hardware components of system 100 include multiple adapters 150, 152, and 154 controlling respective physical drives 160, 161, 162, and 163. Software components of system 100 include controller drivers 140, 142, and 144; controller agents 130, 132 and 134; operating system (OS) 109, which includes OS objects 110; and OS specific agent 120.

In at least one embodiment, adapters 150-154 are RAID adapters controlling storage and access to information on drives 160, which may be any suitable type of random access storage devices, including, but not limited to magnetic drives, optical drives, or the like. Controller drivers 140, 142, and 144 are software drivers providing translation and interface services between OS 109 and respective adapters 150-154.

Each adapter 150-154 and its associated controller driver 140-144, present one or more logical units, e.g. a logical volume, to the operating system 109. Consider, for example, an adapter such as adapter 150, which controls three physical drives 160. To store or retrieve information from any of the drives controlled by adapter 150, operating system 109 uses an addressing framework that employs objects, e.g. disk abstractions, volumes and files, such as that provided by OS objects 110. Thus, for example, although OS 109 may specify that data is to be stored to File AAA on Volume 1 of Disk 1, the data will actually be stored on one of the drives 160 controlled by adapter 150.

The functions of adapter 150 are transparent to OS 109. Consider, for example, the process of storing information. OS 109 delivers data to be stored to adapter 150 via controller driver 140 based on file system abstractions indicated by OS objects 110. That is, OS 109 delivers data to be stored to the logical unit represented by adapter 150. Adapter 150 then stores the data on drives 160 in a manner consistent with the redundancy scheme, e.g. RAID level 1, RAID level 5, etc.

In at least one embodiment, data received at adapter 150 is striped across the disks 160 controlled by adapter 150. The term "striping" refers to a process of distributing data across multiple disks in conceptualized stripes to provide redundant data storage. As used herein, the term stripe refers to a collection of strips.

Figure 4:
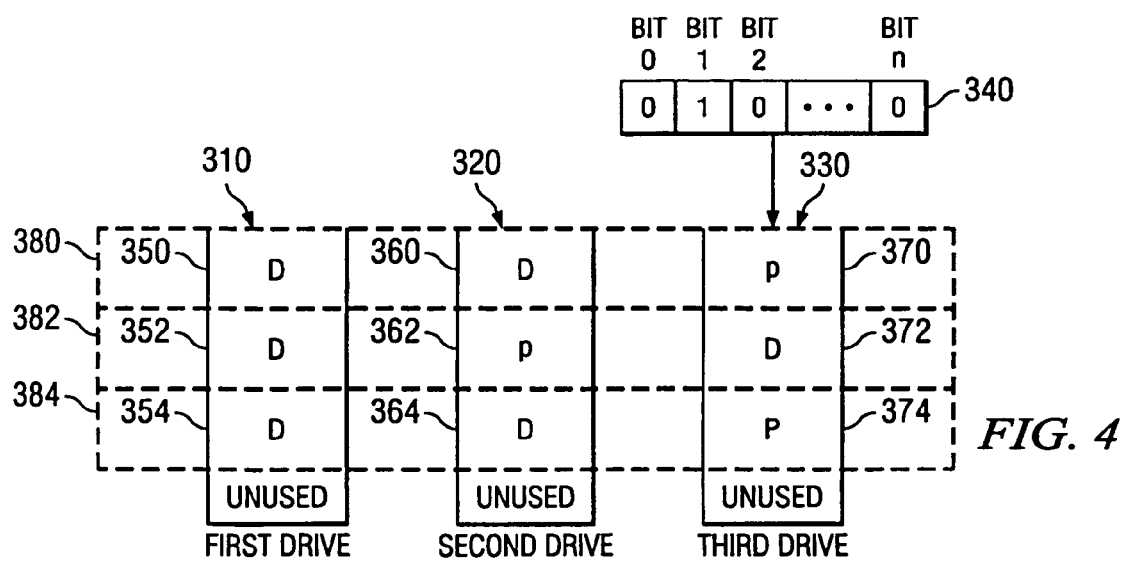
FIG. 4 is a diagram illustrating the relationship of a reduced bitmap to in-use portions of a storage drive according to an embodiment of the present disclosure.

Referring briefly to FIG. 4 which illustrates a RAID 5 virtual disk, portion 350 of first drive 310 is referred to as strip 310. Likewise, portions 360 of second drive 320 and portion 370 of third drive 330 are referred to as strips 360 and 370, respectively. The collection of portions 350-370 is referred to as a stripe 380. Note that each stripe 380, 382, and 384 includes a strip from each disk.

Data received at adapter 150 (FIG. 1) is written to strip 350. When data is written to strip 350, parity data for stripe 380 is calculated, and then written to strip 370. Once strip 350 is full, data is written to strip 360, and parity data for stripe 380 is again calculated and written to strip 370. Note that all of the parity data for stripe 380 is stored on strip 370. Data continues to be written to strip 352, strip 372, strip 354, strip 364, and so on, with parity data for strips 352 and 372 written to strip 362 and parity data for strips 354 and 364 written to strip 374. Note that the parity strip rotates for different stripes.

The use of data and parity strips within a stripe enables data in any of the strips to be rebuilt from data in the remaining strips of the corresponding stripe. For example, the parity data in strip 370, combined with the data in strip 350, can be used to rebuild strip 360. Likewise, the data in strips 350 and 360 can be used to rebuild the parity bits in strip 370.

Referring again to FIG. 1, the operation of OS specific agent 120 and controller agents 130-134 will be discussed. The OS 109, controller drivers 140-144 and adapters 150-154 cooperate during normal operation to store data to, and retrieve data from, drives 160-163. OS specific agent 120 and controller agents 130, 132 and 134 are not generally used by information handling system 100 during normal operations. If one of the drives 160-163 fails, however, the services of OS specific agent 120 and controller agents 130-134 may be invoked.

Since, each of the adapters 150-154 maintains redundant data storage on its associated drives 160-163, if one of the drives 160-163 fails, the adapter associated with the failed drive may no longer provide redundant information storage. For redundancy to be restored, the failed drive is replaced, either by physically removing the failed drive and connecting a replacement, or by using a spare drive that may be a hot spare or one that is manually configured. Regardless of the type of replacement drive used, the replacement drive is rebuilt, in full or in part, so that its contents accurately reflect the contents of the drive being replaced.

In at least one embodiment, upon detecting a drive replacement or other event requiring a rebuild operation, an adapter receiving a replacement drive provides a rebuild notification to its associated controller driver. The controller driver notifies the corresponding controller agent 130-134 of the rebuild event. The controller agent, in response to the notification, requests OS specific agent 120 to provide information identifying which parts of the logical unit associated with the replacement drive are being used by the operating system.

OS specific agent 120 queries OS objects 110 to determine which parts of the logical drive are being used by OS 109, and returns this information to the requesting controller agent. The controller agent may then modify the information received from the OS specific agent 120 based on the specific implementation of the controller and its associated software. The modified information is routed to the appropriate adapter 150, 152, or 154 via the appropriate controller driver 140, 142, or 144. Consider the following specific example.

Still referring to FIG. 1, assume that adapter 152 is a RAID controller controlling the operation of drives 161, 162 and 163. Assume further that RAID level one, referred to as mirroring, is being employed by adapter 152, such that physical drive 161 and drive 162 are copies of each other. Also assume that drive 163 is a hot-swap drive maintained in a ready state, so that upon failure of either drive 161 or 162, drive 163 can immediately take its place. If drive 161 fails, drive 162 is left as the only drive being used to store information for the OS 109. Consequently, no redundancy exists until drive 161 is replaced.

Physical drive 163 can be hot-swapped by adapter 152 to replace failed drive 161. Physical drive 163, however, needs to be rebuilt before redundancy is restored. Towards the beginning of the rebuild process, adapter 152 notifies controller driver 142 that drive 163 needs to be rebuilt to include data formerly stored on failed drive 161. Controller driver 142 forwards this information to controller agent 132.

In at least one embodiment, firmware (not illustrated) included in adapter 152 provides controller agent 132 with information about how drives 161, 162, and/or 163 are used by adapter 152. Controller agent 132 queries OS specific agent 120 for information regarding how the OS 109 is using the logical unit presented by adapter 152.

OS objects 110 responds to the request by providing information about how the OS 109 is using the logical unit presented by adapter 152. Such information may includes which parts of logical volumes, logical disks and/or files are being used by the operating system.

OS specific agent 120, in at least one embodiment, uses the information provided by OS objects 110 to generate a bitmap. This bitmap, which will be discussed in greater detail, subsequently, represents the operating system's usage of the logical unit. The bitmap is transmitted from the OS specific agent 120 to controller agent 132, which modifies the bitmap using the information received from the firmware of adapter 152.

The modified bitmap, rather than indicating how the logical unit presented adapter 152 is used from the viewpoint of the OS 109, indicates which physical portions of failed drive 161 were being used, and consequently which portions of disk 163 should be rebuilt to reconstruct the data that was formerly stored on drive 161.

Controller agent 132 sends this revised bitmap through controller driver 142 to adapter 152. Adapter 152, may then use the information contained in the bitmap to rebuild drive 163. Adapter 152 may rebuild, according to one embodiment, only those portions of drive 163 that are actually being used by the operating system. In other embodiments, adapter 152 rebuilds those portions of drive 163 being used by operating system first, and then rebuilds other portions of physical disk 163. In one form drive 163 is rebuilt to be a functionally exact copy of failed disk 161.

Referring now to FIG. 2, an external RAID controller 151 and associated software components are illustrated according to an embodiment of the present disclosure. Controller specific agent 131 performs essentially the same functions as controller agents 130, 132 and 134 as discussed with reference to FIG. 1. Storage adapter driver 141 interacts with controller specific agent 131 in a manner similar to the way controller drivers 140-144 interact with their respective controller agents. The storage adapter driver 141 is configured to interface with a non-RAID storage adapter such as storage adapter 151.

Storage adapter 151 implements a storage protocol, and is generally configured to be connected to one or more physical drives, but does not provide RAID functionality. This is in contrast to adapters 150, 152 and 154, discussed previously with reference to FIG. 1, which are adapted to be connected to multiple drives to provide RAID functionality and to spread data over the multiple drives in a redundant manner. Non-RAID storage adapters, such as storage adapter 151, may be found in various commercially available information handling systems.

In the event that a user of such an information handling system desires to implement redundant storage using RAID drives, an external RAID controller 152 may be connected to storage adapter 151 to provide the desired functionality. Those skilled in the art will appreciate that various commercially available external RAID controllers are commonly available.

Referring now to FIG. 3, information flow between various portions of a system according to an embodiment of the present disclosure will be discussed. Controller 270 is, in some embodiments, a hardware device used to control multiple physical storage devices (not illustrated) and present a single logical drive to an operating system (not illustrated). Controller firmware 260, controller driver 255, controller agent 250 and O/S agent 240, are, in at least one embodiment, software constructs.

When controller 270 determines that a physical drive needs to be rebuilt, controller 270 issues a rebuild notification to controller driver 255. The rebuild notification is provided to controller agent 250. Controller agent 250 obtains, from OS agent 240, a bit map indicating how the operating system (not illustrated) is using the logical drive represented by controller 270.

OS agent 240 generates the bitmap based on block information from disk abstraction layer 210, file system metadata and file system allocation data from the file system 220, and volume extents information and volume metadata from the volume manager 230. OS agent 240 then provides the bitmap to controller agent 250.

In one embodiment, after requesting OS agent 240 to provide information regarding operating system usage of the logical storage system, controller agent 250 sends a Layout Request to controller firmware 260 via controller driver 255. In response to the Layout Request, controller firmware 260 provides a layout of the logical unit, including the layout of the drive being replaced, to controller agent 250. This layout is used in conjunction with the bitmap received from OS agent 240 to generate a reduced bitmap, which indicates which portions of a physical drive are used by the operating system.

A separate layout request may not be used in all embodiments. In some embodiments, for example, the controller agent may be pre-programmed with any necessary layout information. Furthermore, in some embodiments, the layout information may be provided to controller agent 250 along with the rebuild notification.

In yet other embodiments the controller agent 250 receives the bitmap from the OS 109 and modifies the bitmap based on the stripe size to reduce the size of the bitmap. In such embodiments, the controller agent 250 sends the bitmap configured for the logical drive, instead of reducing it to the level of a physical disk. The RAID controller firmware determines how data is used on the rebuild disk.

The reduced bitmap is provided from controller agent 250 to controller 270 via controller driver 255. Using the reduced bitmap, controller 270 can more efficiently rebuild a replacement drive, because controller 270 can rebuild the portions of the physical drive being used by the operating system prior to rebuilding unused portions of the physical drive, or portions of the physical drive that may be used by other operating systems. Such targeted rebuilding of the physical drive can provide improved efficiency by rebuilding currently used portions of a drive, presumably of more immediate importance since they are being currently used, to be rebuilt prior to less critical portions of the physical drive.

Referring next to FIG. 3, the use of a bitmap according to an embodiment of the present disclosure will be discussed. FIG. 4 illustrates three drives: first drive 310, second drive 320 and third drive 330. The combination of these three drives is presented to an operating system as a single logical unit, e.g. a disk, volume, etc.

Recall that, in the illustrated embodiment, when an operating system writes data to the logical unit represented by drives 310-330, the data is written in strips and stripes under control of, for example, a RAID controller. As illustrated in FIG. 3, stripes 380, 382 and 384 are used by the operating system. The remainder of drives 310-330 remains unused. Note that the unused portion may also be divided into stripes, although such stripes are not illustrated.

Within stripe 380, strip 350 and 360 are used to store data directly, and strip 370 is used to store parity information, so that any single drive 310, 320 or 330 which fails or is replaced can be rebuilt from the data on the remaining two drives. Note that in stripe 382, strip 352 and strip 372 contain data, while strip 362 contains the parity data, and that in stripe 384, strips 354 and 364 contain data, while strip 374 contains parity data.

For purposes of this example, assume that while stripes 380, 382 and 384 all hold data, only stripe 382 holds information being currently used by the operating system. Bitmap 340 includes bits 0-$n$, with each bit position corresponding to a stripe. That is, bit 0 of bitmap 340 corresponds to stripe 380, bit 1 corresponds to stripe 382, bit 2 corresponds to stripe 384, etc.

Since bitmap 340 holds a logical value of 1 in bit position 1, and a value of 0 in all other bit positions, bitmap 340 indicates that stripe 382 is the only stripe that includes information currently being used by the operating system. According to at least one embodiment, therefore, strip on the replacement drive of stripe 382 will be rebuilt first, before any of the stripes corresponding to bit positions having a 0 value. So, for example, if drive 310 were to fail and be replaced by another drive, when rebuilding the new drive strip 352 would be rebuilt first, since strip 352 is included in stripe 382, and stripe 382 is the only stripe being currently used by the operating system. In at least one embodiment, only after strip 352 is rebuilt are strips 350 and 354 rebuilt.

Bitmap 340 may be constructed so that each bit represents 4K of data, where 4K may be a commonly used allocation size that is used by many file systems. Such a bitmap constructed for a two terabyte logical unit would be 64 megabytes. For a logical unit with 64K strip size, the bitmap received from the O/S specific agent can be further reduced to 512 kilobytes of data. A further optimization that is possible for RAID levels greater than RAID 1 is to create a bitmap of only the strips on a drive on which the rebuild needs to take place i.e. for a stripe. For a five drive RAID level 5, the size of the bitmap could be reduced to 128 kilobytes.

The bitmap in one such embodiment is a sparse bitmap, with a bit representing each available unit of allocation on the logical disk or the operating system objects. However, simple compression techniques or alternate representation mechanisms can be used to reduce the size of the bitmaps. Such compression techniques and representations will become apparent to one skilled in the art upon consideration of the present disclosure.

Figure 5:
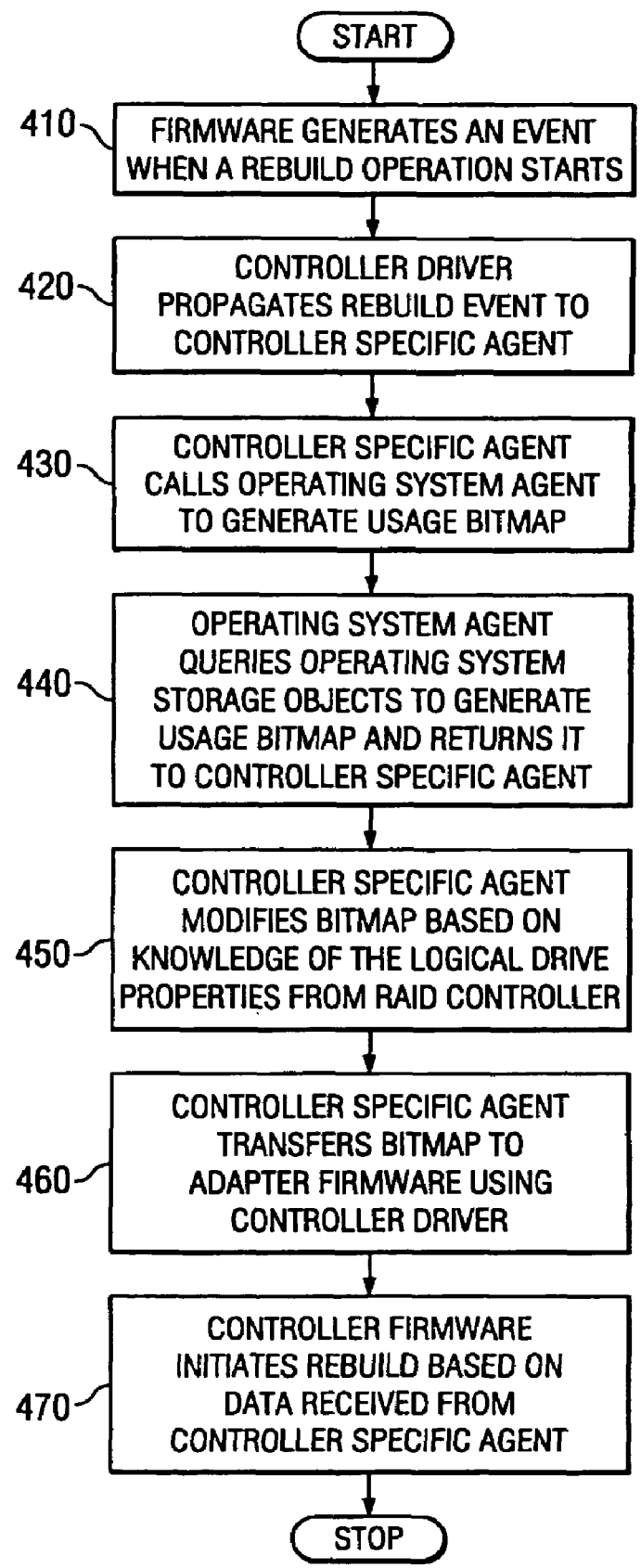
FIG. 5 is a flow diagram illustrating a method of providing a controller with information identifying portions of a physical drive used by an operating system according to an embodiment of the present disclosure.

Referring next to FIG. 5, a method according to an embodiment of the present disclosure will be discussed. When an event that requires a rebuild operation occurs, RAID controller firmware generates an event at 410. Notification of the rebuild event is provided to a controller specific agent by the controller driver at 420.

The controller specific agent calls an operating system agent to generate a usage bitmap at 430. The usage bitmap indicates which portions of a logical unit are being used by an operating system. To make the determination of which portions of a logical unit are currently being used by an operating system, the OS agent queries OS storage objects at 440. Also at 440, the OS agent generates a usage bitmap and returns the bitmap to the controller specific agent.

The controller specific agent modifies the bitmap at 450. Such a modification may be made based on information obtained from RAID controller firmware. At 460, the controller specific agent transfers the modified bitmap to firmware in the RAID controller via the controller driver. At 470, the controller firmware initiates a rebuild based on the bitmap received from the controller specific agent.

Note that in various embodiments, the bitmap is transferred to the RAID controller using direct memory access. Additionally, the bitmap may be broken into smaller chunks and transferred to the RAID controller in a piece-meal fashion. The actual mechanism for transferring the bitmap is, according to at least one embodiment, a function of the interface between the OS specific driver and the controller firmware, and is handled by the controller specific agent.

Various actions described in relation to FIG. 4 may be implemented in other than the illustrated order without departing from the spirit and scope of the present disclosure. So, for example, although FIG. 4 describes the OS agent querying OS storage objects to generate a usage bitmap after a controller specific agent calls the OS agent, in other embodiments the OS specific agents maintain a bitmap during normal operation, so that the bitmap is available for immediate delivery to the controller specific agent when requested.

Although the disclosed embodiments have been described in detail, it should be understood that various changes, substitutions and alterations can be made to the embodiments without departing from their spirit and scope.

What is claimed is:

1. A method comprising:
   providing a plurality of storage drives;
   receiving a request from an adapter for rebuilding a failed drive of the plurality of storage drives;
   receiving information regarding which portions of the failed drive are used by an operating system;
   generating a bitmap based at least on the received information regarding which portions of the failed drive were used by the operating system; and
   rebuilding at least the portions of the failed drive used by the operating system.

2. The method of claim 1, wherein rebuilding comprises rebuilding the portions of the failed drive used by the operating system prior to rebuilding unused portions of the failed drive.

3. The method of claim 1, wherein rebuilding comprises rebuilding only the portions of the failed drive used by the operating system.

4. The method of claim 1, wherein the bitmap is a sparse bitmap, with each bit representing a corresponding unit of allocation.

5. The method of claim 1, wherein generating the bitmap comprises using at least one of file system allocation information, volume extents information, volume metadata information, or block information.

6. The method of claim 1, further comprising:
   rebuilding the portion of the failed drive used by the operating system on a RAID drive.

7. The method of claim 6, wherein the RAID drive is selected from the group consisting of a hot-swap drive and a replacement drive.

8. An information handling system comprising:
   a processor;
   a plurality of storage drives coupled to the processor, the plurality of storage drives configured in a redundant configuration;
   a first agent coupled to the plurality of storage drives, the first agent configured to:
      receive a request from an adapter for rebuilding a failed drive of the plurality of storage drives;
      receive information regarding which portions of the failed drive are used by an operating system;
   a second agent coupled to the first agent configured to:
      generate a bitmap based at least on the received information regarding which portions of the failed drive were used by the operating system; and
   an adapter configured to rebuild the failed disk drive based at least on the generated bitmap.

9. The information handling system of claim 8, further comprising a controller configured to initiate a rebuild operation, the rebuild operation comprising rebuilding the portions of the failed drive used by the operating system prior to rebuilding unused portions of the failed drive.

10. The information handling system of claim 9, wherein the rebuild operation comprises rebuilding only the portions of the failed drive used by the operating system.

11. The information handling system of claim 9, wherein the controller is a RAID controller.

12. The information handling system of claim 8, wherein generating a bitmap comprises generating a sparse bitmap, with each bit of the bitmap representing a corresponding unit of allocation.

13. The information handling system of claim 8, wherein generating a bitmap comprises generating the bitmap using at least one of file system allocation information, volume extents information, volume metadata information, or block information.

14. The information handling system of claim 8, wherein:
   the first agent is further configured to:
      send a request for a layout of the failed drive; and
      receive the requested layout; and
   the second agent is further configured to generate the bitmap based at least on the layout request.

15. A computer readable medium tangibly embodying a program of executable instructions, operable to, when executed:
   receive a request from an adapter for rebuilding a failed drive of a plurality of storage drives;
   receive information identifying which portions of the failed drive are used by an operating system;
   generate a bitmap based at least on the information identifying which portions of the failed drive were used by the operating system; and
   rebuild at least the portions of the failed drive used by the operating system based at least on the generated bitmap.

16. The computer readable medium of claim 15, further operable to modify the bitmap based on properties of the failed drive.

17. The computer readable medium of claim 15, further operable to provide a sparse bitmap, with each bit of the bitmap representing a corresponding unit of allocation.

18. The computer readable medium of claim 15 wherein rebuilding comprises rebuilding portions of the failed drive used by the operating system prior to initiating a rebuild of an unused portion of the failed drive.

19. The computer readable medium of claim 15 wherein rebuilding comprises rebuilding only the portions of the failed drive used by the operating system.

* * * * *